(No Model.)

H. WELISCH.
VEHICLE BRAKE.

No. 354,282. Patented Dec. 14, 1886.

Witnesses:
Wm Mayer
Joseph E. Ford

Inventor:
Herman Welisch
By Wm Smith
Atty.

UNITED STATES PATENT OFFICE.

HERMAN WELISCH, OF COCHISE COUNTY, ARIZONA TERRITORY.

VEHICLE-BRAKE.

SPECIFICATION forming part of Letters Patent No. 354,282, dated December 14, 1886.

Application filed September 21, 1886. Serial No. 214,200. (No model.)

*To all whom it may concern:*

Be it known that I, HERMAN WELISCH, a citizen of the United States, residing in the county of Cochise, in the Territory of Arizona, have invented a new and useful Improvement in Vehicle-Brakes, of which the following is a specification, reference being had to the accompanying drawings, forming a part thereof, in which—

Figure 1:
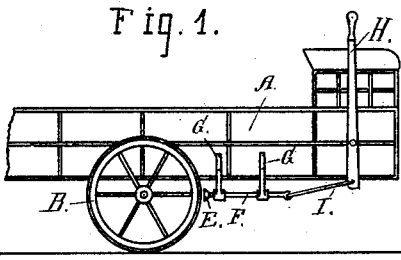
Figure 3:
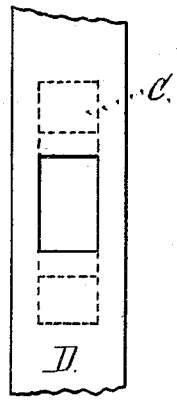
Figure 2:
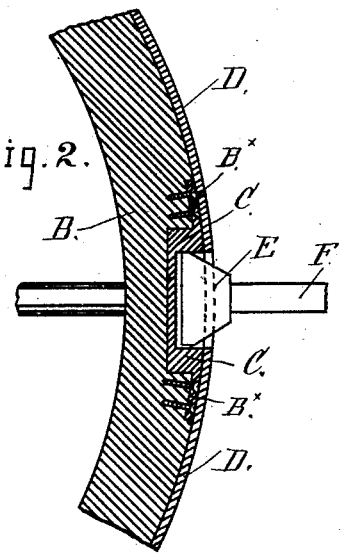
Figure 4:
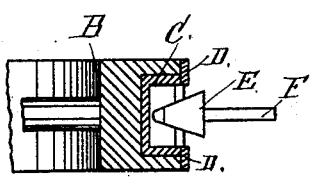

Figure 1 is an elevation of a portion of a vehicle with my brake attached. Fig. 2 is a section of my brake through rim of the wheel. Fig. 3 is an outer view of rim or tire, as seen from the right to the left of Fig. 2. Fig. 4 is a horizontal section through rim of wheel.

This invention consists of a socket or oblong slot formed within the felly of the wheel, in which the brake-block acts, passing through a slot in the tire corresponding in size to the opening in the felly.

Let A represent the body of a vehicle and B the wheel. Within the outer face of the felly is constructed an oblong socket or rabbet of suitable depth to receive the metal or steel box C, which latter is provided with curved flanges or extension-straps $B^x$, which are countersunk in the felly so as to be even or flush with the face of it, in which position the box is held by the screws passing through the straps and entering the felly, as shown.

The rabbet or socket takes in one-half the face or thickness of the felly, inclusive of the metal boxing, and a slot is made in the tire B of the wheel to correspond with the opening in the box, leaving the edges opposed to the slot or box upon both sides of the tire and felly intact, and so that the felly and tire will not be materially weakened at the point of contact with the brake-block.

The brake-block E is made of one solid piece of hammered or wrought iron of lesser length and thickness than the slot or recess in the box, and the block is rigidly connected to the brake-rod F, and is cut tapering or inclined upon both edges backward to its juncture with the connecting or brake rod in such a manner that the engaging ends or points will be a sort of chisel or wedge shape.

The brake-rod with its connected brake-block is on a longitudinal plane with the body of the vehicle, and works in the connected eyebolts or straps G by means of the vertical lever H and jointed connecting-arm I, and by moving the vertical lever forward will cause the face or point of the brake-block to enter the slot, recess, or box in the face of the wheel and prevent it from turning upon its axle in either direction.

The bearing-face of the brake block should be made a little smaller than the slot or recess in the wheel, as before mentioned, and the ends slightly curved or made tapering, so that one end of the block will take bite in the end of the box or recess, and brake or lock the wheel either in its forward or backward movement, and more especially when the box or recess becomes packed or filled with gravel or mud, to act upon and clear out one end of the box to admit one point of the block, as it is not intended that the face of the block should enter the full depth of the recess or boxing at all times during the braking operation. Three of these slots may be made of equal distances apart in the rim of each brake-wheel, if desired, so that the wheel will travel only one-third of its diameter before being arrested by the brake-block.

Having thus described my invention, what I claim, and desire to secure by Letters Patent, is—

1. In a vehicle-brake, a boxed socket or recess formed in the rim of the wheel with a corresponding slot formed in the tire of the wheel adapted to receive a brake-block rigidly connected to a brake-rod, constructed, arranged, and operating substantially in the manner as herein set forth and specified.

2. The slotted or recessed felly of a vehicle-wheel containing a metal box with curved flanges countersunk in the face of the rim or felly and bound by a recessed or slotted tire, in combination with a metal brake-block having tapering points adapted to enter the slot or recess of the wheel in the manner described.

In testimony that I claim the foregoing I have hereunto set my hand and seal.

HERMAN WELISCH. [L. S.]

Witnesses:
C. W. M. SMITH,
CHAS. E. KELLY.